(12) United States Patent
Chin et al.

(10) Patent No.: US 8,837,102 B2
(45) Date of Patent: *Sep. 16, 2014

(54) SNUBBER CIRCUIT

(75) Inventors: Jeffrey Jen Hui Chin, Singapore (SG); David Seng Poh Ho, Singapore (SG)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/116,534

(22) Filed: May 26, 2011

(65) Prior Publication Data

US 2012/0287547 A1 Nov. 15, 2012

Related U.S. Application Data

(63) Continuation of application No. 11/865,465, filed on Oct. 1, 2007, now Pat. No. 7,969,704.

(51) Int. Cl.
*H02H 7/00* (2006.01)
*H02H 9/04* (2006.01)

(52) U.S. Cl.
CPC .................................... *H02H 9/047* (2013.01)
USPC ........................................................ 361/93.1

(58) Field of Classification Search
USPC ........................................................ 361/93.1
See application file for complete search history.

(56) References Cited

U.S. PATENT DOCUMENTS

| | | | |
|---|---|---|---|
| 5,883,540 A | 3/1999 | Kwon | |
| 6,577,482 B1 * | 6/2003 | Eisenhardt et al. | 361/84 |
| 7,969,704 B2 * | 6/2011 | Chin et al. | 361/111 |

OTHER PUBLICATIONS

Office Action received for U.S. Appl. No. 11/865,465, mailed on Sep. 30, 2010, 5 pages.
Office Action Response filed for U.S. Appl. No. 11/865,465, filed on Jan. 31, 2011, 13 pages.
Notice of Allowance received for U.S. Appl. No. 11/865,465, mailed Feb. 22, 2011, 5 pages.

* cited by examiner

*Primary Examiner* — Stephen W Jackson
(74) *Attorney, Agent, or Firm* — McDermott Will & Emery

(57) ABSTRACT

A circuit comprising a first transistor group configured to electrically isolate, at least in part, a second transistor group from an input voltage; the second transistor group configured to provide voltage protection to a third transistor group; and the third transistor group configured to switch on and off.

20 Claims, 7 Drawing Sheets

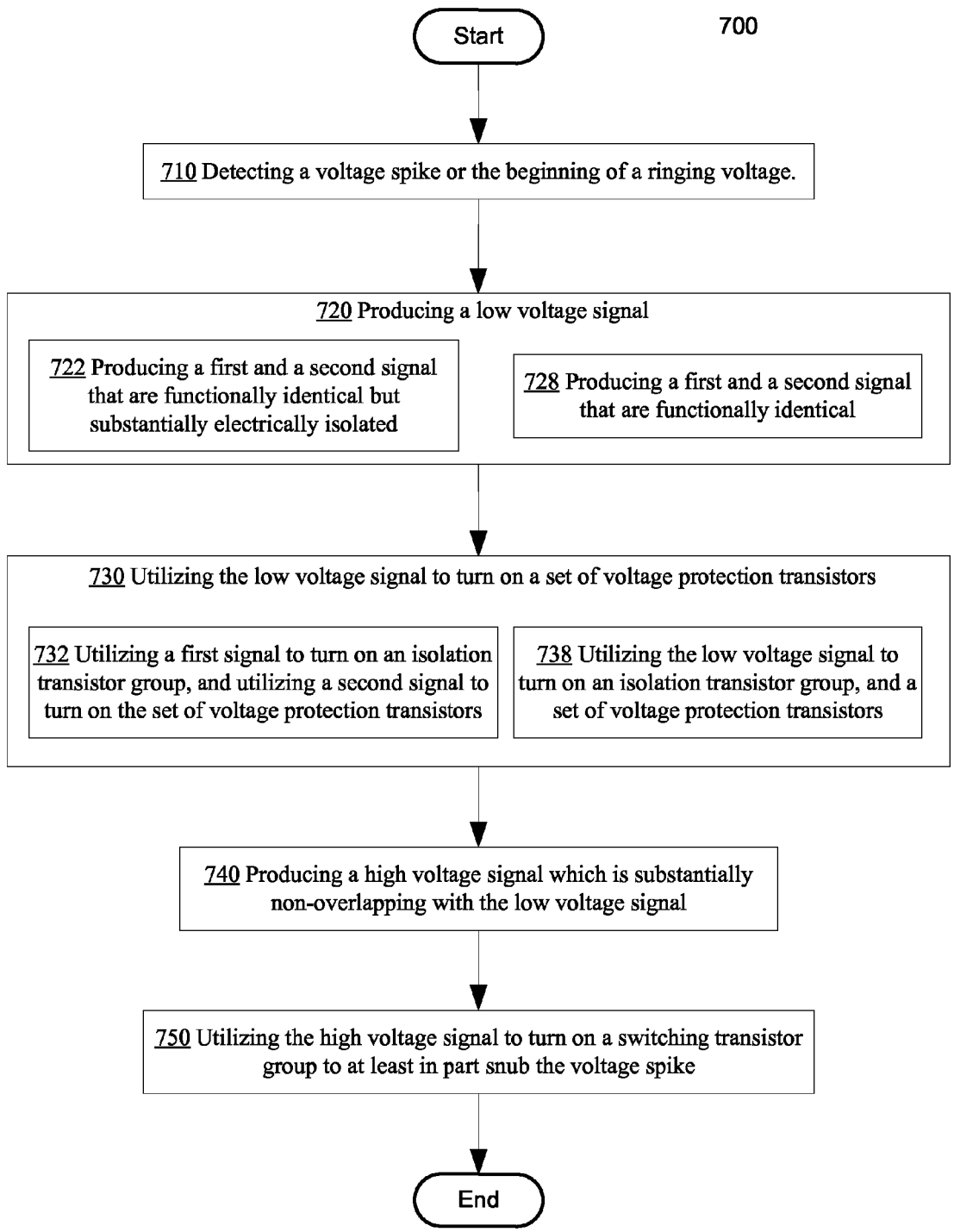

SNUBBER CIRCUIT

CROSS-REFERENCE TO RELATED APPLICATION

This application is a continuation of application Ser. No. 11/865,465, filed on Oct. 1, 2007, now issued as U.S. Pat. No. 7,969,704 entitled "Snubber Circuit". The subject matter of this earlier filed application is hereby incorporated by reference.

TECHNICAL FIELD

This description relates to attempting to detect and dampen an oscillation in an electrical signal, and more specifically, a circuit, system and technique for snubbing a voltage spike or the ringing of a signal.

BACKGROUND

A snubber or snubber circuit is often a simple electrical circuit used to suppress ("snub") electrical transients. Snubbers are frequently used with an inductive load where the sudden interruption of current flow would lead to a sharp rise in voltage across the device creating the interruption. This sharp rise in voltage might lead to a transient or permanent failure of the controlling device.

Frequently, a snubber may consist of a small resistor in series with a small capacitor. In some instances, the snubber circuit may also include a switch in series with the resistor and capacitor. If an electrical transient is detected, the switch may be closed allowing the resistor and capacitor to snub the transient.

FIG. 1 is a schematic diagram illustrating a traditional snubber circuit. As an electrical transient (e.g., a voltage spike or ringing) occurs at the Vin terminal 105, the snubber circuit 110 (enclosed within the dotted line) may be turned on. The snubber circuit may be used to provide a substantial short circuit across the inductive load 120 between the Vin terminal and Vout terminal 190. The electrical transient may be detected by the voltage detector 130. Typically, the voltage detector would turn on the transistor 140. In this solid-state version of a traditional snubber circuit, the transistor may function as the switch, resistor and capacitor. The transistor may be turned on and allow current flow in a similar manner as a closed switch. Also, the transistor typically includes resistive and capacitive characteristics.

SUMMARY

According to one general aspect, a circuit comprising a first transistor group configured to electrically isolate, at least in part, a second transistor group from an input voltage; the second transistor group configured to provide voltage protection to a third transistor group; and the third transistor group configured to switch on and off.

According to another general aspect, a system comprising a high voltage switch having: a first transistor group configured to electrically isolate, at least in part, a second transistor group from an input voltage, the second transistor group configured to provide voltage protection to a third transistor group, and the third transistor group configured to switch on and off; a low voltage switch driver configured to provide a low voltage first signal to the first transistor group and a low voltage second signal to the second transistor group; and a high voltage switch driver configured to provide a high voltage third signal to the third transistor group.

According to another general aspect, a method comprising detecting an electrical transient; producing a low voltage signal; utilizing the low voltage signal to turn on a set of voltage protection transistors; producing a high voltage signal which is substantially non-overlapping with the low voltage signal; and utilizing the high voltage signal to turn on a switching transistor group to at least in part snub the electrical transient.

The details of one or more implementations are set forth in the accompanying drawings and the description below. Other features will be apparent from the description and drawings, and from the claims.

BRIEF DESCRIPTION OF THE DRAWINGS

FIG. 7 is a flowchart illustrating an embodiment of a technique for snubbing a voltage spike or the ringing of a signal.

DETAILED DESCRIPTION

Figure 2:
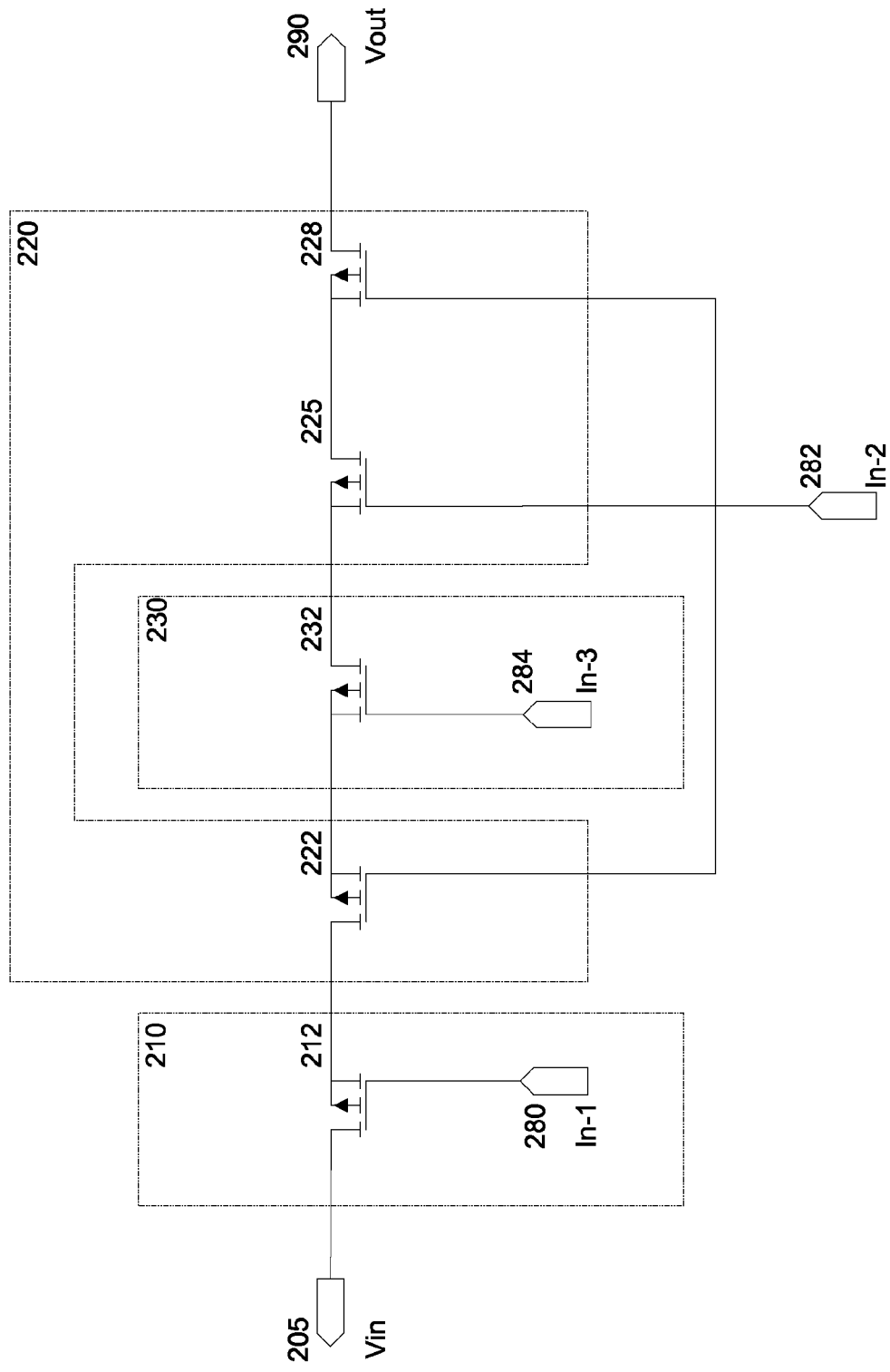
FIG. 2 is a schematic diagram illustrating an embodiment of a circuit for snubbing a voltage spike or the ringing of a signal.

FIG. 2 is a schematic diagram illustrating an embodiment of a circuit 200 for snubbing a voltage spike or the ringing of a signal. In one embodiment, the circuit may include three transistor groups 210, 220, & 230 (bounded by dotted lines). In one embodiment, the first transistor group 210 may be configured to, at least in part, electrically isolate the second transistor group 220. In one embodiment, the second transistor group may be configured to provide voltage protection to a third transistor group 230. In one embodiment, the third transistor group may be configured to switch on and off.

As stated above, in one embodiment, the first transistor group 210 may be configured to, at least in part, electrically isolate the second transistor group 220. In one embodiment, the first transistor group may include isolation transistor 212.

In one embodiment, the isolation transistor 212 may have its substrate tied to its source. This may, in one embodiment, prevent a high bulk-source voltage drop. In one embodiment, the drain of the isolation transistor may be connected to the terminal Vin 205. In one embodiment, the gate may be connected to a first control signal In-1 280. In one embodiment, the first control signal may operate between a 0V and half the battery voltage (Vbat). In one embodiment, where the voltage battery is 5.5V, the first control signal may substantially operate between 0V and 2.75V, inclusive. In one embodiment, this first control signal may be provided by a low voltage switch driver.

In one embodiment, the first transistor group 210 may be controlled by a different signal than the second transistor group 220. In one embodiment, this may minimize any switching noise or spikes coupled via the parasitic gate-to-drain capacitance (Cgd) of the first transistor group to the second transistor group. In one embodiment, the isolation may be provided, at least in part, by not connecting the second transistor group directly to the input terminal Vin 205, but instead through the first transistor group.

In one embodiment, the isolation transistor 212 may be a positive channel metal-oxide semiconductor (PMOS) transistor manufactured by a conventional complementary metal-oxide semiconductor (CMOS) process. In one embodiment, the transistor may be manufactured using a 65 nm process. Such a process may result in a transistor that may withstand or has a breakdown voltage of 2.75V and not more than 4.1V for voltage spikes. However, it is understood that this is merely one illustrative embodiment and other embodiments are within the scope of the disclosed subject matter. In one embodiment, the isolation transistor may be a PMOS transistor, although negative channel metal-oxide semiconductor (NMOS) transistors are within the scope of the disclosed subject matter.

In one embodiment, the circuit 200 may include a second transistor group 220 configured to provide voltage protection to a third transistor group. In one embodiment, the second transistor group may include two parts. An input part, illustrated as transistor 222, may be connected between the first transistor group 210 and the third transistor group 230. An output part, illustrated as transistors 225 & 228, may be connected between the third transistor group 210 and the output terminal Vout 290 (discussed in more detail below).

In one embodiment, the drain of transistor 222 may be connected to the source of the isolation transistor 212. By facing the high-impedance side of the transistor towards the input terminal Vin 205, this may, in one embodiment, increase the isolation of the switching transistor 232 from any voltage spikes. In one embodiment, the isolation transistor may have its substrate tied to its source.

The gate of the transistor 222 may be connected to a second control signal In-2 282. In one embodiment, the gate of transistors 225 & 228 may also be connected to the second control signal. Therefore, all three transistors may turn "on" and "off" substantially simultaneously and provide voltage protection to the third transistor group 230. Conversely, in one embodiment, the transistors of the second transistor group may be connected to multiple control signals. In one embodiment, the second control signal may operate between a 0V and half the battery voltage (Vbat). In one embodiment, where the voltage battery is 5.5V, the second control signal may substantially operate between 0V and 2.75V, inclusive. In one embodiment, this second control signal may be provided by a low voltage switch driver. In one embodiment, the second control signal may be substantially or effectively identical to the first control signal 280 (e.g., transition substantially simultaneously to the same target voltages) but be substantially electrically isolated to reduce any unwanted electrical coupling. Such isolation is described above in relation to the isolation transistor 212 and the first control signal 280.

In one embodiment, the second transistor group 220 may include PMOS transistors manufactured by a conventional CMOS process. In one embodiment, the transistors may be manufactured using a 65 nm process. Such a process may result in a transistor that may withstand (e.g., has a breakdown voltage of) 2.75V and not more than 4.1V for voltage spikes. However, it is understood that this is merely one illustrative embodiment and other embodiments are within the scope of the disclosed subject matter.

In one embodiment, the circuit 200 may include a third transistor group 230 configured to switch "on" and "off". In one embodiment, this third transistor group may include switching transistor 232.

In one embodiment, the switching transistor 232 may have its substrate tied to its source. This may, in one embodiment, prevent a high bulk-source voltage drop. In one embodiment, the source of the switching transistor may be connected to the source of the input part of the second transistor group 220. In one embodiment, the drain of the switching transistor may be connected to the source of the output part of the second transistor group. In one embodiment, the gate may be connected to a third control signal In-3 284. In one embodiment, the third control signal may operate between a 0V and the battery voltage (Vbat). In one embodiment, where the voltage battery is 5.5V, the third control signal may substantially operate between 0V and 5.5V, inclusive. In one embodiment, this third control signal may be provided by a high voltage switch driver.

In one embodiment, the third control signal may be non-overlapping with the first and second control signals 280 & 282. In one embodiment, the third control signal may fall before the first and second control signals. In one embodiment, the third control signal may rise after the first and second control signals. In one embodiment, the timing may facilitate the prevention of the breakdown of the transistors, or some of the transistors, from occurring. In one embodiment, the non-overlapping nature of the control signals may allow the gate-to-source (Vgs) of the switching transistor 232 to never be subjected to the full battery voltage (Vbat).

In one embodiment, the switching transistor 232 may be a PMOS transistor manufactured by a conventional CMOS process. In one embodiment, the transistor may be manufactured using a 65 nm process. Such a process may result in a transistor that may withstand (e.g., has a breakdown voltage of) 2.75V and not more than 4.1V for voltage spikes. However, it is understood that this is merely one illustrative embodiment and other embodiments are within the scope of the disclosed subject matter. In one embodiment, the switching transistor may be a PMOS transistor, although NMOS transistors are within the scope of the disclosed subject matter.

Returning to the second transistor group 220, in one embodiment, the output transistors 225 & 228 may be configured such that the source portion of the output part of the second transistor group (e.g., the source of transistor 225) is connected with the drain of the third transistor group 230. In one embodiment, the drain portion of the output part of the second transistor group (e.g., the drain of transistor 228) is connected with the output terminal Vout 290.

In one specific illustrative embodiment, such a snubber circuit 200 may be used with or as part of a switching regulator application. In various embodiments, switching regulators rapidly switch a series device on and off. The duty cycle of the switch determines how much charge is transferred to the load. In one embodiment, this switching or another abrupt change in the signal may result in an electrical transient or ringing. In such an embodiment, the snubber circuit may be turned on to ameliorate or snub the electrical transient. In one embodiment, the snubber circuit may provide a short across an inductive load in an attempt to stop the output of the switching regulator from ringing.

In one illustrative embodiment, the switching regulator may be used in two modes, pulse width mode (PWM) and burst mode. These two modes will be used to illustrate the operation of the circuit in one illustrative embodiment as the sub-elements of snubber circuit 200 are discussed below. However, it is understood that this is merely one illustrative embodiment of the disclosed subject matter and that other embodiments are contemplated.

In one embodiment, burst mode may be used when the device is in a form of standby mode or similar low power state. This mode may include a signal which pulses for a short amount of time and then stops switching. Such an abrupt change in the signal may create a ringing or electrical transient.

Figure 1:
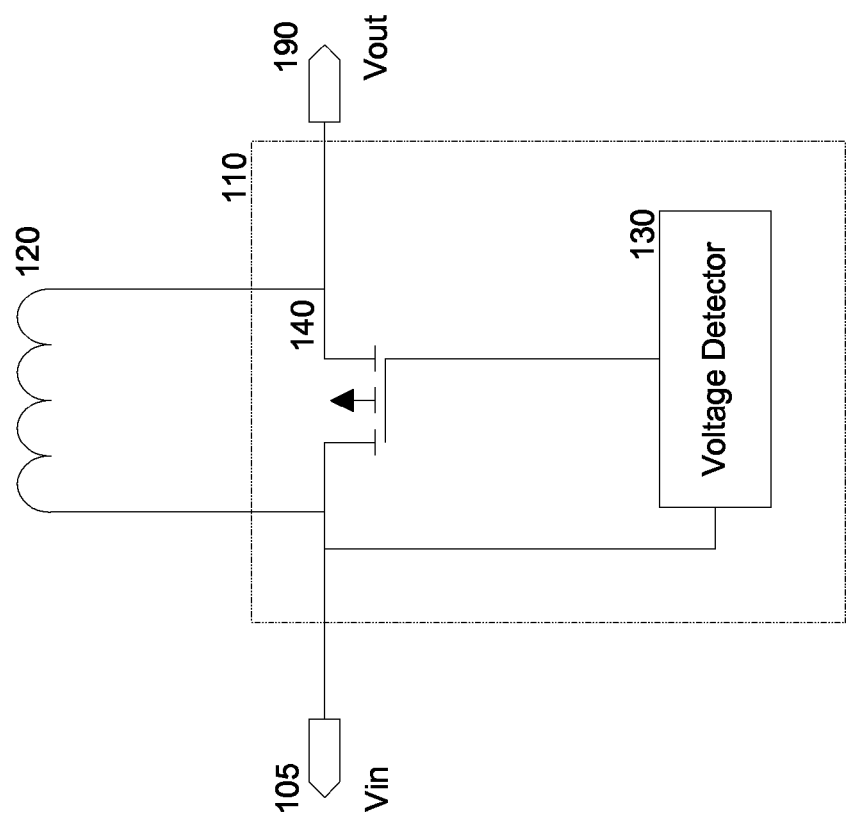
FIG. 1 is a schematic diagram illustrating a traditional snubber circuit.

In one embodiment, during burst mode, the input terminal Vin 205 may switch between a low and high voltage for a short period of time. In one embodiment, the low and high voltages may be 0V and 5.5V, respectively. In this embodiment, this may be done to bring the output terminal Vout 290 to a desired voltage. Once, this is done, in this embodiment, the input terminal may be set to a high impended state. At this moment, due to the presence of an inductive load (shown in FIG. 1), current may want to continue to flow; hence a high voltage ringing can occur at Vin. This ringing may be detrimental to many neighboring circuits that may pick up this ringing as noise. Therefore, in this embodiment, it may be desirable for the snubber circuit to stop this ringing by short circuiting the inductor.

In this embodiment, the when the voltage ringing is detected, the first control signal In-1 280 may switch to a low state (e.g., 0V). This may turn the first transistor group 210, including isolation transistor 212, "on". Prior to Vin 205 switching again, the first control signal may go high (e.g., 2.75V) and turn the isolation transistor "off".

In one embodiment, during burst mode, a voltage ringing may occur. In this embodiment, the second control signal In-2 282 may switch to a low state (e.g., 0V). This may turn the second transistor group 220 "on". Prior to Vin switching again, the second control signal may go high (e.g., 2.75V) and turn the second transistor group "off".

In this embodiment, the when voltage ringing is detected, the third control signal In-3 284 may switch to a low state (e.g., 0V). This may turn the third transistor group 230, including switching transistor 232, "on". Prior to Vin switching again, the third control signal may go high (e.g., 5.5V) and turn the switching transistor "off". Due to the non-overlapping nature of the control signals, the first and second transistor groups 210 & 220 will, in this embodiment, have already switched off prior to the third control signal going high. Therefore, in this embodiment, the switching transistor may not be subjected to a high gate-to-source voltage.

It is understood that the voltage analysis of the output part 225 & 228 of the second transistor group 220 is analogous to the voltage analysis of the first transistor group 210 and the input part 222 of the second transistor group, discussed above. However, in various embodiments, the voltage of Vout may tend to be a stable output voltage. In one specific illustrative embodiment, Vout may be usually more than 1V but less than 3V in normal pulse width mode operation. Therefore, the output part of the second transistor group may be subject to less stress than the first transistor group and the input part of the second transistor group.

In the illustrative embodiment, pulse width mode may include applying, to the Vin terminal 205, a substantially square wave whose pulse width and duty cycle may be varied to achieve a desired output voltage. It is understood by one skilled in the art that an actual square wave is rarely as uniform and perfect as the textbook ideal square wave. In one embodiment, the PWM may occur during the operation of a device and produce a high, relatively speaking, current.

In one embodiment, during pulse width mode the snubber circuit 200 may be open or in an "off" state. In this embodiment, the first control signal In-1 280 may be held at a high voltage. In one embodiment, this voltage may be 2.75V. In the case where Vin is low (e.g., 0V), the isolation transistor 212 will be "off" and the gate-source (Vgs) voltage is negative. The source of the isolation transistor may likely be one threshold voltage (Vth) above the gate voltage (Vg). In one embodiment, the source voltage (Vs) may not drop significantly due to leakage as the isolation transistor may tend to switch "off" even more and stop the voltage drop from happening. In the case where Vin is high (e.g., 5.5V), the isolation transistor will be "on", but as described below the switching transistor 232 will be protected. Additionally in this embodiment, because the first control signal is held high (e.g., 2.75V) the Vgs of the isolation transistor will be below the breakdown voltage.

However, in one embodiment, during pulse width mode switching currents may be very high. These high currents may cause high voltage spikes to occur at Vin 205 during switching transitions. In this embodiment, Vin may go about above the designated high voltage and below the designated low voltage. In one specific embodiment, where the voltages are designated as 5.5V and 0V, Vin may vary, for example, between 6.5V and −1V. In such an embodiment, the gate of the isolation transistor 212 may be specifically tied to a first control signal 280 that is not electrically the same as the second control signal 282 of the second transistor group 220. In this embodiment, any spikes occurring in the first transistor group 210 may not couple into the second control signal through the parasitic gate-drain capacitance (Cgd) of the isolation transistor. Because of the spikes, it may also be desirable, in some embodiments, that the high impedance node (e.g., the drain) of the isolation transistor faces the Vin terminal to minimize disturbances on the rest of the switch.

As previously stated, in one embodiment, during pulse width mode the snubber circuit may be open or in an "off" state. In this embodiment, the second control signal In-2 282 may be held at a high voltage. In one embodiment, this voltage may be 2.75V. In the case where Vin is low (e.g., 0V), the transistor 222 will be "off" and the gate-source (Vgs) voltage is negative. The source of the transistor 222 may likely be one threshold voltage (Vth) above the gate voltage (Vg). In one embodiment, the source voltage (Vs) may not drop significantly due to leakage as the transistor may tend to switch "off" even more and stop the voltage drop from happening. In one embodiment, the source of transistor 222 may be even higher than that of the isolation transistor 212 due to the cascading nature of the circuit and a possible leakage current. In the case where Vin is high (e.g., 5.5V), the input transistor will be "on", but as described below the switching transistor 232 will be protected. Additionally in this embodiment, because the second control signal is held high (e.g., 2.75V) the Vgs of the input transistor will be below the breakdown voltage.

Again, in one embodiment, during pulse width mode the snubber circuit may be open or in an "off" state. In the case where Vin is low (e.g., 0V), the first and second transistor groups 210 & 220 may be off. Furthermore, in one specific embodiment where Vbat is 5.5V, the source of the input part of the second transistor group (illustrated as transistor 222) may be at 2.75V, minus the threshold voltage (Vth), as described above. If Vth is 0.5V, the source of transistor 222, and therefore the source of the switching transistor 232, would be 2.25V. In this embodiment, the third control signal 284 and therefore the gate voltage of the switching transistor may be high, for example 5.5V. Therefore, the Vgs of the switching transistor would be 2.25V, 0.5V below the breakdown voltage of 2.75V. It is understood that the voltages are merely one illustrative embodiment and the disclosed subject matter is not limited to these exact voltages.

In the case where Vin is high (e.g., 5.5V), both the isolation transistor 212 and the input transistor 222 will be "on". Therefore, the source of the switching transistor 232 will be at 5.5V. However, since the third control signal 284 is also high (e.g., 5.5V), the gate-to-source (Vgs) voltage across the switching transistor is 0V. This is below the breakdown voltage of the switching transistor.

It is understood that the embodiments describing a burst and a pulse width mode are merely two non-limiting illustrative embodiments, and that other embodiments, and modes of operation are within the scope of the disclosed subject matter. Also, it is understood that while only three transistors of the second transistor group has been discussed other embodiments, exist where a number of transistors occur with in the second transistor group. Furthermore, it is understood that NMOS or even non-metal oxide semiconductor field effect transistor (non-MOSFET) embodiments are within the scope of the disclosed subject matter. It is also understood that any specific voltages are merely illustrative embodiments, of possible voltage levels and the disclosed subject matter is not so limited.

In one embodiment, the device that includes the snubber circuit 200 may include a device or chip that transmits and receives wireless signals, such as, for example, substantially Bluetooth complaint signals, frequency modulated (FM) signals, wireless local area network (WLAN) signals which are substantially compliant with one of the IEEE 802.11 standards, etc. In another embodiment, the snubber circuit may be included in a device or chip that allows for video or audio processing. It is understood that these are merely a few illustrative embodiments of the disclosed subject matter and other embodiments are contemplated.

Figure 3:
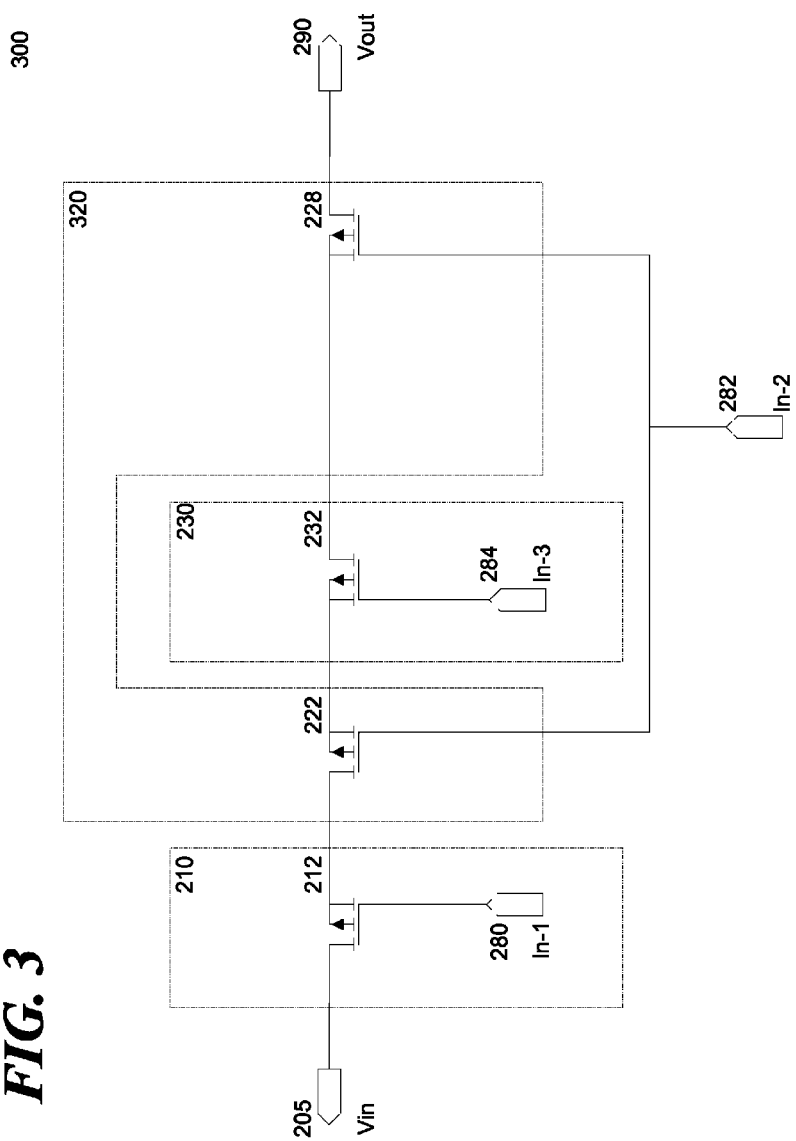
FIG. 3 is a schematic diagram illustrating an embodiment of a circuit for snubbing a voltage spike or the ringing of a signal.

FIG. 3 is a schematic diagram illustrating an embodiment of a circuit 300 for snubbing a voltage spike or the ringing of a signal. In one embodiment, the second transistor group 320 may be altered from that described above. In this embodiment, the output part of the second transistor group may include only one transistor 228. Such an embodiment, may still allow voltage protection of the third transistor group. Conversely, embodiments may exist where the number of transistors in the first and second transistor groups 210 & 320 may be increased to add additional protection to the third transistor group 230. However, in such an embodiment, as the number of transistors in series increases so does the "on" resistance of the circuit. In one embodiment, at least some of the transistors may be sized accordingly to manage the increased resistance.

Figure 4:
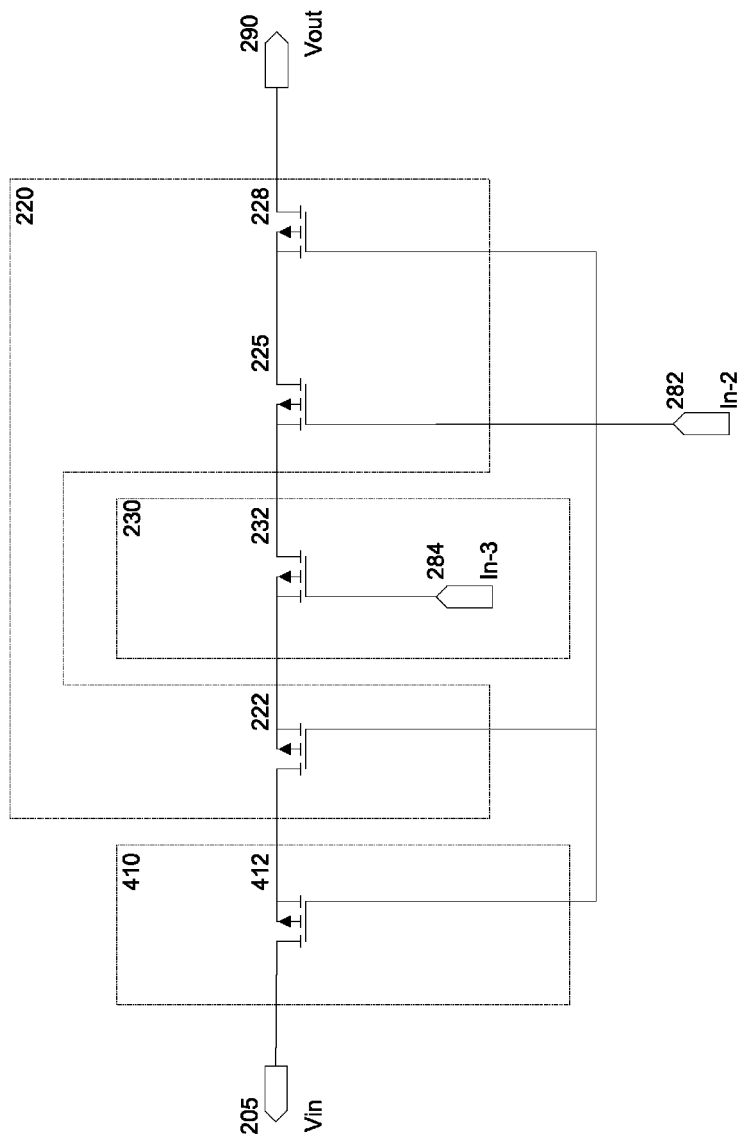
FIG. 4 is a schematic diagram illustrating an embodiment of a circuit for snubbing a voltage spike or the ringing of a signal.

FIG. 4 is a schematic diagram illustrating an embodiment of a circuit 400 for snubbing a voltage spike or the ringing of a signal. In one embodiment the first transistor group 410 may include isolation transistor 412. In the illustrated embodiment, the gate of the isolation transistor may be connected, not to the first control signal, but to the second control signal In-2 282. In one such embodiment, the first and second control signals may exist but be electrically coupled so as not to just be functionally identical but electrically identical as well. However, it is understood that these are merely illustrative embodiments, and other embodiments are within the scope of the disclosed subject matter.

Figure 5:
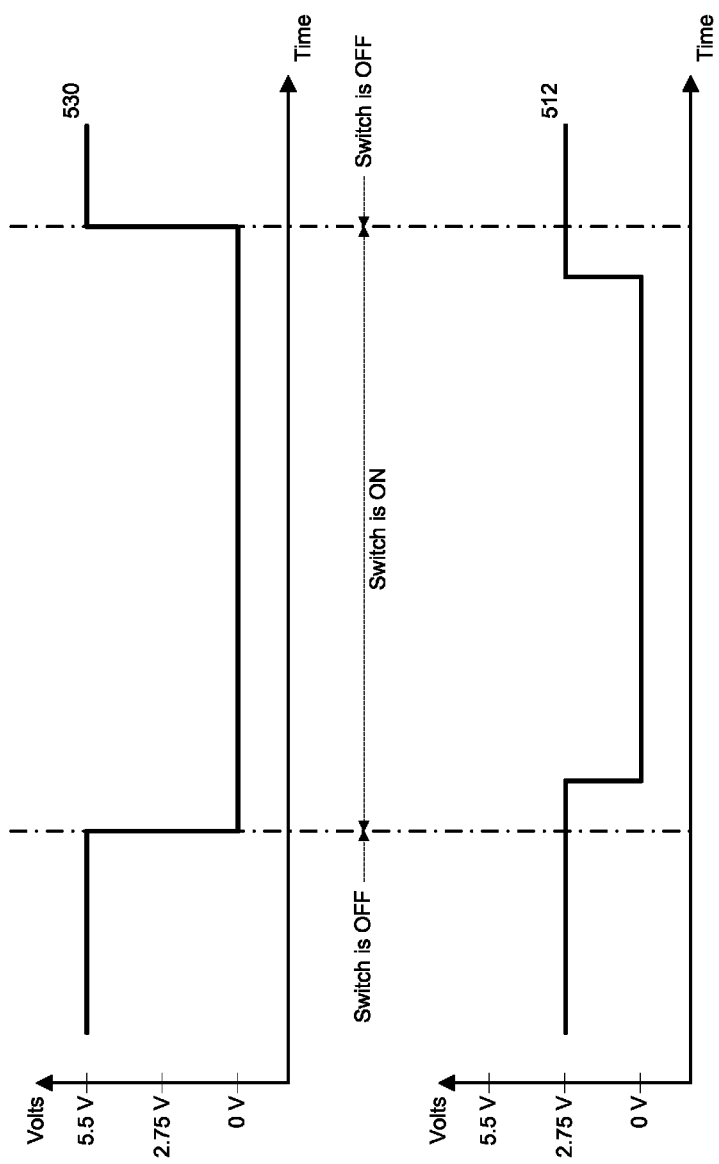
FIG. 5 is a timing diagram illustrating control signals which may be used in one embodiment of a system for snubbing a voltage spike or the ringing of a signal.

FIG. 5 is a timing diagram illustrating control signals which may be used in one embodiment of a system for snubbing a voltage spike or the ringing of a signal. The third control signal 530 is shown transitioning between, in this embodiment, a voltage of 0V and 5.5V. The first and second control signals 512 are shown transitioning between, in this embodiment, a voltage of 0V and 2.75V. It is understood that these are merely three illustrative example voltage ranges and that the disclosed subject matter is not limited to these specific voltages.

As described in reference to FIG. 2 above, in one embodiment, the third control signal 530 may be non-overlapping with the first and second control signals 512. In one embodiment, the first and second control signals may be functionally identical (as shown) but not electrically coupled, as described above. In one embodiment, the third control signal may fall before the first and second control signals. In one embodiment, the third control signal may rise after the first and second control signals. In one embodiment, the timing may facilitate the prevention of the breakdown of the transistors, or some of the transistors, from occurring. In one embodiment, the non-overlapping nature of the control signals may allow the gate-to-source (Vgs) of the switching transistor 232 of FIG. 2 to never be subjected to the full battery voltage (Vbat). The "on" and "off" state of the switching transistor is also shown.

Figure 6:
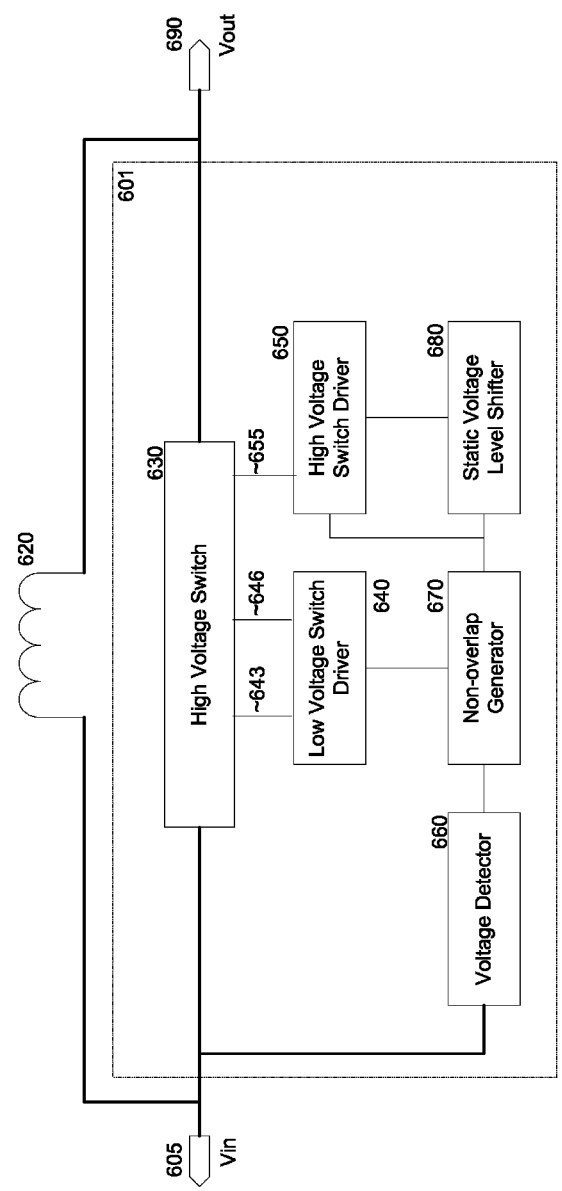
FIG. 6 is a diagram of illustrating an embodiment of a system for snubbing a voltage spike or the ringing of a signal.

FIG. 6 is a diagram of illustrating an embodiment of a system 601 for snubbing a voltage spike or the ringing of a signal. In one embodiment, the system may be configured to be in parallel with an inductive load 620, between an input terminal Vin 605 and an output terminal Vout 690. In one embodiment, the input terminal may operate in two modes, a pulse width mode and a burst mode as described above. However, these are merely two illustrative modes to which the disclosed subject matter is not limited.

In one embodiment, the system 601 may include a high-voltage switch 630 configured to attempt to snub an electrical transient. In one embodiment, the high voltage switch may include a first transistor group configured to electrically isolate, at least in part, a second transistor group from an input voltage, the second transistor group configured to provide voltage protection to a third transistor group, and the third transistor group configured to switch on and off, as described above in reference to FIGS. 2, 3, & 4.

In one embodiment, the system 601 may include a low voltage switch driver 640 configured to provide a low voltage control signal to the high voltage switch 630. In one embodiment, the low voltage switch driver may be configured to provide a low voltage first signal 643 to the first transistor group and a low voltage second signal 646 to the second transistor group of the high voltage switch. These low voltage signals may operate as the first and second control signals described above in reference to FIGS. 2, 3, & 4. In one embodiment, the low voltage switch driver may be configured to provide signals ranging between 0V and half of the battery voltage (Vbat). In one specific embodiment, Vbat may be 5.5V.

In one embodiment, the system 601 may include a high voltage switch driver 650 configured to provide a high voltage control signal 655 to the high voltage switch 630. This high voltage signal may operate as the third control signal described above in reference to FIGS. 2, 3, & 4. In one embodiment, the high voltage switch driver may be configured to provide signals ranging between 0V and the battery voltage (Vbat). In one specific embodiment, Vbat may be 5.5V.

In one embodiment, the system 601 may include a voltage detector 660 configured to detect an undesirable electrical transient. In one embodiment, once an electrical transient is detected the voltage detector may initiate the operation of the high voltage switch 630. In one embodiment, the voltage detector may do this by sending a signal to a non-overlapping generator 670, which may then generate the signals which may ultimately, in one embodiment, become the first, second and third control signals described above in reference to FIGS. 2, 3, & 4. In one embodiment, the voltage detector may include a common-source amplifier and inverter. However, it is understood that other implementations and embodiments of the voltage detector are within the scope of the disclosed subject matter.

In one embodiment, the system 601 may include a non-overlapping generator 670 configured to generate control signals that facilitate the prevention of shoot through current in the drivers 640 & 650 while switching, at the same time, ensuring that the switching action is fast enough. In one embodiment, the non-overlapping generator may be configured to generate the signals which may ultimately, in one embodiment, become the first, second and third control signals described above in reference to FIGS. 2, 3, & 4.

In one embodiment, the system 601 may include a static voltage level shifter 680 configured to control the driver of the high voltage switch driver 650. In one embodiment, the static voltage level shifter may be configured to convert a signal from a 0 to 2.75V signal to a 2.75V to 5.5V signal. However, it is understood that this is merely one illustrative embodiment, and the disclosed subject matter is not so limited.

FIG. 7 is a flowchart illustrating an embodiment of a technique 700 for snubbing a voltage spike or the ringing of a signal. Block 710 illustrates that, in one embodiment, an electrical transient (e.g., a voltage spike or a ringing voltage) may be detected. In one embodiment, this may occur because the pulse portion of a burst mode has ended. In one embodiment, the voltage detector 660 of FIG. 6 may perform this detection as described above.

Block 720 illustrates that, in one embodiment, a low voltage signal may be produced. Block 722 illustrates that, in one embodiment, the low voltage may be two, or more signals which are functionally identical but electrically isolated, as described above in reference to FIG. 2. Block 728 illustrates that, in one embodiment, the low voltage may be two, or more signals which are functionally identical. In one embodiment, the low voltage switch driver 640 and the non-overlapping generator 670 of FIG. 6 may perform this generation as described above.

Block 730 illustrates that, in one embodiment, the low voltage signal(s) may be utilized to turn on a set of voltage protection transistors. In one embodiment, the voltage protection transistors may be second transistor group 220 and 320 described above in reference to FIGS. 2 & 3, respectively. Block 732 illustrates that, in one embodiment, a first low voltage signal may be utilized to turn on an isolation transistor group and a second signal may be used to turn on a voltage protection transistor group. In one embodiment, the voltage protection transistors may be second transistor group 220 and 320 described above in reference to FIGS. 2 & 3, respectively. In one embodiment, the isolation transistor group may be first transistor group 210 described above in reference to FIGS. 2 & 3. Block 738 illustrates that, in one embodiment, that the low voltage signal may be utilized to turn on both an isolation transistor group and a voltage protection transistor group. In one embodiment, the voltage protection transistors may be second transistor group 220 described above in reference to FIG. 4. In one embodiment, the isolation transistor group may be first transistor group 410 described above in reference to FIG. 4. In one embodiment, the low voltage switch driver 640 or the high voltage switch 630 of FIG. 6 may perform this utilization as described above.

Block 740 illustrates that, in one embodiment, a high voltage signal may be produced. In one embodiment, the high voltage signal may be produced prior to or substantially simultaneously with the low voltage signal(s). In one embodiment, the high voltage switch driver 650, the static voltage level shifter 680 and the non-overlapping generator 670 of FIG. 6 may perform this generation as described above.

Block 750 illustrates that, in one embodiment, the high voltage signal may be used to turn on a switching transistor group to at least in part snub the electrical transient. In one embodiment, the high voltage signal may be utilized as described in as the third control signal 284 of FIGS. 2, 3, & 4, above. In one embodiment, the snubbing of the electrical circuit may be performed by the switching transistor 232 of FIGS. 2, 3, & 4, above. In one embodiment, the high voltage switch driver 650 or the high voltage switch 630 of FIG. 6 may perform this generation as described above.

Implementations of the various techniques described herein may be implemented in digital electronic circuitry, or in computer hardware, firmware, software, or in combinations of them. Implementations may implemented as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus configured to be placed in parallel with an inductive load, the apparatus comprising:
   a high-voltage switch configured to attempt electrically to protect the inductive load;
   a low-voltage switch driver configured to provide at least one control signal to the high-voltage switch; and
   a high-voltage switch driver configured to provide a signal to the high-voltage switch.

2. The apparatus of claim 1, wherein the high-voltage switch comprises:
   a first portion configured to electrically isolate, at least in part, a second portion from an input voltage;
   the second portion configured to provide voltage protection to a third portion; and
   the third portion configured to switch on and off.

3. The apparatus of claim 2, wherein, the first portion of the high-voltage switch is configured to be controlled by a first control signal provided by the low-voltage switch driver; and
   wherein the second portion of the high-voltage switch is configured to be controlled by a second control signal provided by the low-voltage switch driver.

4. The apparatus of claim 2 wherein, the third portion is configured to be controlled by the signal provided by the high-voltage switch driver.

5. The apparatus of claim 1, further comprising a voltage detector configured to detect an undesirable electrical transient, and, once the undesirable electrical transient has been detected, configured to cause operation of the high-voltage switch.

6. The apparatus of claim 1, further comprising a non-overlapping generator configured to generate control signals to reduce shoot-through current in the high-voltage switch driver and low-voltage switch driver.

7. The apparatus of claim 1, further comprising a static voltage level shifter configured to control a driver of the high-voltage switch driver.

8. The apparatus of claim 1, wherein the apparatus is configured to operate in one of two operating modes, wherein the two operating modes include:
   a pulse width mode wherein the apparatus is configured to receive a first input signal that includes a substantially square wave whose pulse width and duty cycle are varied to achieve a desired output voltage, and
   a burst mode wherein the apparatus is configured to receive a second input signal that switches between a low and high voltage for a short period of time and then stops switching.

9. An apparatus comprising:
   a means for electrically isolating, at least in part, a means for protecting from an input voltage;
   the means for protecting protects a means for switching; and
   the means for switching switches on and off and is controlled by a signal provided by a high-voltage switch driver.

10. The apparatus of claim 9 wherein, the means for electrically isolating is controlled by a first control signal provided by a low-voltage switch driver; and
    wherein the means for protecting is controlled by a second control signal provided by the low-voltage switch driver.

11. The apparatus of claim 9 wherein, the means for switching is configured to be:
    turned on before the means for electrically isolating and the means for protecting are turned on, and
    turned off after the means for electrically isolating and the means for protecting are turned off.

12. The apparatus of claim 9 wherein, the means for electrically isolating is configured to minimize electrical coupling of a switching noise with the means for protecting.

13. The apparatus of claim 9 wherein, the means for protecting includes:
    an input portion electrically connected between the means for electrically isolating and the means for switching; and
    an output portion electrically connected between the means for switching and an output terminal.

14. A method comprising:
    detecting an electrical transient;
    turning on a voltage protection circuit configured to protect an inductive load;
    producing, by a low-voltage switch driver, a first control signal configured to control, at least partially, the voltage protection circuit; and
    level shifting a voltage level of a signal to control a driver of the voltage protection circuit.

15. The method of claim 14, further comprising producing, by a high-voltage switch driver, a second control signal configured to control, at least partially, the voltage protection circuit.

16. The method of claim 15, further comprising generating control signals to reduce shoot-through current in the high-voltage switch driver and the low-voltage switch driver.

17. The method of claim 15, further comprising utilizing the second control signal to turn on a switching circuit to at least in part snub the electrical transient.

18. The method of claim 14, further comprising generating control signals to reduce shoot-through current in the low-voltage switch driver.

19. The method of claim 15, wherein the level shifting comprises level shifting a voltage level of a signal to control a driver of the high-voltage switch driver.

20. The apparatus of claim 1, further comprising a non-overlapping generator configured to generate control signals for the high-voltage switch driver and low-voltage switch driver.

* * * * *